United States Patent [19]

Mason

[11] Patent Number: 5,162,488
[45] Date of Patent: Nov. 10, 1992

[54] CATALYST SYSTEM AND PROCESS FOR PREPARING POLYETHYLENE TEREPHTHALATE

[75] Inventor: James D. Mason, Charlotte, N.C.

[73] Assignee: Hoechst Celanese Corporation, Somerville, N.J.

[21] Appl. No.: 705,871

[22] Filed: May 28, 1991

Related U.S. Application Data

[62] Division of Ser. No. 354,947, May 22, 1989, Pat. No. 5,153,164.

[51] Int. Cl.$^5$ .................... C08G 63/02; C08G 63/78; C08J 5/09
[52] U.S. Cl. ........................... 528/275; 528/272; 528/274; 524/779; 524/783; 524/785
[58] Field of Search ............... 528/272, 275, 280, 281, 528/285; 524/779, 783, 785

[56] References Cited

U.S. PATENT DOCUMENTS

| | | | |
|---|---|---|---|
| 3,907,754 | 9/1975 | Tershansy et al. | 528/286 |
| 4,010,145 | 3/1977 | Russin et al. | 528/287 |
| 4,122,107 | 10/1978 | Kenny | 528/285 |
| 4,990,594 | 2/1991 | Cooke et al. | 528/272 |

FOREIGN PATENT DOCUMENTS 1135233 4/1966 United Kingdom.
1147239 4/1969 United Kingdom.

Primary Examiner—John Kight, III
Assistant Examiner—T. Mosley
Attorney, Agent, or Firm—Gregory N. Clements

[57] ABSTRACT

A novel catalyst system, a process for using the novel catalyst system, and a product made from the process is described. The novel catalyst system is specific for producing polyethylene terephthalate made from reacting terephthalic acid and ethylene glycol, wherein the catalyst system includes at least 650 ppm antimony; cobalt and/or zinc, and at least one of zinc, magnesium, manganese or calcium. The antimony is generally present from about 650 ppm to about 1100 ppm. The cobalt and/or zinc is usually present from about 15 ppm to about 60 ppm, and the zinc, magnesium, manganese or calcium, as the third component, is generally present from about 10 ppm to about 150 ppm. The amounts of all catalyst components are based on the theoretical yield of the polymer. Using the novel catalyst system to produce PET drastically increases the polymerization rate. In the process, the novel catalyst system can be introduced any time before the polycondensation stage of the manufacturing process.

20 Claims, No Drawings

CATALYST SYSTEM AND PROCESS FOR PREPARING POLYETHYLENE TEREPHTHALATE

This is a division of application Ser. No. 354,947 filed May 22, 1989, now U.S. Pat. No. 5,153,164.

BACKGROUND OF THE INVENTION (1) Field of the Invention

The present invention relates to a catalyst system for manufacturing polyethylene terephthalate (PET) and a process of producing PET using the catalyst system. In particular, the present invention relates to a novel catalyst system unique in producing PET from terephthalic acid and ethylene glycol. The unique catalyst system always includes antimony and generally includes cobalt and/or manganese and/or zinc. The catalyst system of the present invention may also include magnesium and calcium. In the manufacturing process, using the catalyst system of the present invention, the polymerization rate is drastically increased without substantially sacrificing color and clarity of the polymer produced.

(2) Prior Art

Polyethylene terephthalate is prepared from one of two processes, namely: (1) the DMT process and (2) the TA process. In the DMT process dimethyl terephthalate (DMT) is reacted with ethylene glycol in an ester interchange reaction (trans-esterification) to yield bis(2-hydroxyethyl) terephthalate (monomer) and methanol. Because the reaction is reversible, it is necessary to remove the methanol to completely convert the raw materials into monomer. It is known to use manganese and/or cobalt and/or zinc, etc. in the ester interchange reaction. The catalyst activity is then sequestered (arrested) by introducing phosphorus at the end of the ester interchange reaction. The monomer then undergoes a condensation reaction (polycondensation) which polymerizes the monomer to PET. When the monomer undergoes polycondensation, the catalyst most frequently employed is antimony. If the catalysts employed in the ester interchange reaction are not arrested with phosphorus, the resultant polymer easily degrades (thermal degradation) and has a very unacceptable yellow color. See *Kinetic Aspects of Catalyzed Reactions in the Formation of Poly(ethylene terephthalate)* by S. G. Hovenkamp, published in the Journal of Polymer Science, Part A-1, Vol. 9, pages (3617-3625) 1971.

The following patents are exemplary of the DMT process in which manganese and cobalt are employed as catalysts in the ester interchange step in producing PET. U.S. Pat. No. 3,907,754 to Tershansy et al., U.S. Pat. No. 4,010,145 to Russin et al., and U.S. Pat. No. 4,122,107 to Kenney disclose using manganese, cobalt, zinc, or other metals, or their salts in the ester interchange or transesterification process. Additionally, Reissue U.S. Pat. No. 32,765 to Callander et al. also discusses using a cobalt compound in making PET. Each of the patents also discloses employing phosphorus at the end of the transesterification process to sequester or arrest all catalytic activity.

The second method for making PET is to react terephthalic acid (TA) with ethylene glycol in a direct esterification reaction producing bis(2-hydroxyethyl) terephthalate or "monomer" and water. This reaction is also reversible and thus can be carried to completion by removing the water during the reaction. The direct esterification step does not require a catalyst and conventionally no catalysts are employed. Just as in the DMT process, the monomer then undergoes polycondensation to form PET. The polycondensation reaction typically uses antimony as a catalyst.

In the direct esterification step in the TA process, no catalysts are employed. In fact, when materials such as manganese, cobalt, or zinc employed in the ester interchange in the DMT process are tried in the direct esterification in the TA process, such materials have little or no catalytic effect.

In summary, if the DMT process is employed to make PET, there are two steps, namely: ester interchange (transesterification) and polycondensation. All catalytic activity is arrested at the end of the first step by introducing phosphorus. If the TA process is employed to make PET, there are also two steps, namely: direct esterification and polycondensation. Generally no catalyst system is employed in the direct esterification step. In both processes, antimony is the preferred catalyst in the polycondensation step.

It is the primary aim of the present invention to increase the polymerization rate in the TA process for making polyethylene terephthalate.

Another primary object of the present invention is to create a catalyst system which substantially increases the polymerization rate for producing PET from TA, whereby the catalyst system can be added at anytime before the beginning of or during the polycondensation step.

SUMMARY OF THE INVENTION

The present invention relates to novel catalyst systems which are effective in producing PET by means of the TA process. Additionally, the present invention relates to a method for producing PET using the specific catalyst system.

In the broadest sense, the present invention comprises a catalyst system specific for producing PET by the TA process, wherein the catalyst system includes: 1) at least 650 ppm antimony, 2) cobalt and/or zinc, and 3) at least one of zinc, magnesium, manganese or calcium. The preferred catalyst systems include manganese, cobalt, and antimony; or zinc, cobalt, and antimony; or manganese, zinc, and antimony. These catalyst systems of the present invention, when used in the most effective amounts, increase the polymerization rate thereby reducing the polymerization time by approximately at least one-third, and in some cases up to one-half of the time otherwise required under control conditions.

In the broadest sense, the present invention also comprises a method for making PET by the TA process comprising the steps of: reacting terephthalic acid with ethylene glycol; removing the resultant water to more completely react the terephthalic acid and ethylene glycol; polymerizing the resultant monomer to form PET by polycondensation; the improvement comprising adding a catalyst system at any time before the beginning of or during the polycondensation step, said catalyst system comprising: 1) at least 650 ppm antimony, 2) cobalt and/or zinc, and 3) at least one of manganese, zinc, magnesium or calcium.

When stating that the catalyst system can be added at any time before or prior to polycondensation, it is intended to include the addition of one or more of the catalyst metals in the terephthalic acid, glycol or other feedstock materials. For example, all the catalyst metals could be added into the terephthalic acid feedstream in a continuous process, or some of the catalyst metals in the terephthalic acid feedstream and the remainder in the glycol feedstream, or the catalyst system could be added in with other additives like coloring agents. Accordingly, as the terephthalic acid and ethylene glycol are reacted at least some of the catalyst system could already be present.

In the broadest sense, the present invention also comprises a PET product made by the above mentioned process of the present invention.

In the broadest sense, the present invention comprises PET having from about 650 ppm to about 1100 ppm antimony; from about 5 ppm to about 60 ppm of at least one of zinc and cobalt; and from about 10 ppm to about 150 ppm of at least one of zinc, magnesium, manganese or calcium.

DESCRIPTION OF THE PREFERRED EMBODIMENTS

Polyethylene terephthalate of the present invention is prepared from terephthalic acid and ethylene glycol. The present invention may be used to produce PET using either a continuous process or a batch process, both of which are well known in the art.

In a conventional batch process, PET is made by reacting the two components, in a molar ratio of ethylene glycol to terephthalic acid of about 1 to about 1.5, at a pressure range of about 5 psia to about 85 psia, and at a temperature range of about 185° C. to about 290° C. for about 1 to about 5 hours. This reaction, known as the direct esterification stage, does not require a catalyst. The products formed are monomer and water. The use of a slight excess of ethylene glycol and the removal of the water as the reaction proceeds, allows the normally reversible reaction to proceed to completion, in accord with the well known Le Chatelier's principle.

The second stage of a conventional batch process involves polymerization of the monomer at a pressure range of 0 to 40 mm Hg at a temperature range of about 205° C. to about 305° C. for approximately 1 to 4 hours. This stage, normally described as a polycondensation stage, forms PET. The polycondensation stage conventionally employs an antimony catalyst generally in the form of a compound, such as antimony acetate or antimony trioxide. Conventionally, other additives may be added during the process such as brighteners, blueing agents, color pigments, opaquing agents, and thermal stabilizers, etc. The addition of such agents may also be included with the present invention, but are not considered to be a part of the present invention.

The conventional continuous process is basically an extension of the batch process in which a series of 2 or more sequentially connected vessels are used to perform the stages of the direct esterification and polycondensation reactions. In general, a continuous feed of raw materials is used, employing a molar ratio of ethylene glycol to terephthalic acid of about 1 to about 1.6. Again, the water formed as a by-product is removed as the reaction proceeds, to enable the reaction to proceed to completion. The first vessel in the process is generally at a pressure range of 0 to 70 psig with the pressure in each successive vessel decreasing to the final polymerization vessel which is generally at a pressure range of 0 to 40 mm Hg. Higher pressures in the final polymerization vessel are indicative of more reactive polymer processes when other conditions are held constant. The temperature range through the series of vessels generally increases from 185° C. to 290° C. in the first vessel to 205° C. to 305° C. in the last vessel. The increase in temperature and the decrease in pressure aid the removal of excess ethylene glycol and force the reaction equilibrium to higher molecular weights. The flow of the reactant stream is continuous through each vessel and from vessel to vessel. In addition, the output of PET is continuous. In the continuous process there is generally no direct esterification catalyst employed. However, the polycondensation catalyst, generally an antimony catalyst as in the batch process, may be introduced into the first vessel with the raw materials (i.e., present during the direct esterification stage) or into a vessel further along in the process prior to or during polycondensation but after the direct esterification stage is completed.

The present invention differs from the conventional system in the catalyst system employed and in the polymerization rate. The catalyst systems of the present invention greatly increase the polymerization rate. The metallic catalyst system, in addition to antimony, includes a first metallic catalyst of cobalt, zinc, or a mixture of these, and a second metallic catalyst of at least one of manganese, zinc, calcium and magnesium. It is theorized that cobalt, which is not a particularly effective metallic catalyst when combined with antimony, may make any of zinc, manganese, calcium, or magnesium more active when employed therewith. Likewise, it is theorized that zinc, as a substitute for the cobalt may also make manganese, calcium or magnesium more active, if combined with any of them. The simplest catalyst system of the present invention comprises zinc and antimony.

The metallic catalysts of the present invention are Lewis acids and may be in the form of inorganic compounds such as carboxylates (such as acetates), compounds of Group VI (such as oxides or sulfides), halides such as chlorides, amines, etc., which are preferably soluble in the polymer melt. The amount of catalyst added in the present invention refers to the "amount of metal in the catalyst itself". Thus, if 300 ppm of antimony is employed, for example, it would not matter if antimony trioxide or antimony acetate were employed, so long as the actual amount of antimony metal present is 300 ppm.

Although the applicant does not wish to be bound by any particular theory of the invention, it appears that the overall increase in rate provided by the invention is the additive effect of two catalytic mechanisms. The first mechanism is the effect of antimony as a coordination catalyst for the oligomers and polymers formed during the direct esterification of terephthalic acid and ethylene glycol. The second mechanism appears to be the effect of a Lewis acid upon the acid catalyzed polymerization of the oligomers and polymers.

The catalyst system of the present invention comprises: a first metal catalyst of zinc, cobalt, or a mixture of these; a second metal catalyst of zinc, manganese, magnesium, calcium, or a mixture of two or more of these: and a third component of antimony. The first metal catalyst is employed in a range of from 5 ppm to about 60 ppm, preferably from 10 ppm to 40 ppm based on the theoretical polymer yield (100 percent conversion). The second metal catalyst is employed in a range of from 10 ppm to about 150 ppm, preferably from 20 ppm to 50 ppm based on the theoretical polymer yield. Antimony is employed in the range of from about 650 ppm to about 1100 ppm based on the theoretical yield of the polymer. The amounts of catalysts added are generally the same as what generally carries through to the product produced. Some of the catalysts may volatilize and escape with the off gas from the reaction. The actual polymer yield may be less than the theoretical polymer yield. These explanations may explain why there could be a variance between the amounts of catalyst initially employed in the present invention and the amounts actually obtained.

The simplest catalyst system of the present invention would comprise the bimetallic catalyst of zinc and antimony. The remaining catalyst systems are trimetallic or polymetallic catalysts comprising antimony, zinc and/or cobalt, and at least one of zinc (when cobalt is employed), magnesium, manganese, or calcium. The preferred catalyst systems of the present invention comprise: manganese, cobalt, and antimony; or manganese, zinc, and antimony; or zinc, cobalt, and antimony. When any of the catalyst systems of the present invention is employed in the most effective amounts, the polymerization rate is increased thereby reducing the polymerization time by approximately at least one-third compared to that of the conventional catalyst system comprising just antimony.

EXPERIMENTAL

Autoclave batches (roughly 25 lbs. of polymer) were prepared in which all batches were run at a 1.4 ethylene glycol to terephthalic acid molar ratio (13.1 lbs. of EG, 25.0 lbs. of TA) in a batch process. The autoclave was first charged with ethylene glycol and then terephthalic acid. The resulting monomer was achieved by undergoing the direct esterification of terephthalic acid and ethylene glycol at approximately 210 to 250° C. and about 35 to 70 psig. Completion of the direct esterification was determined by a drop in the column top temperature (the end of water distillation) and confirmed by weighing the water collected in the receiver during the direct esterification. The pressure in the autoclave was then reduced to atmospheric and sufficient antimony oxide ($Sb_2O_3$) was added to provide 300 parts per million (ppm) antimony metal in the theoretical yield of the polymer. A thermal stabilizer (optional) comprising 10 percent polyphosphoric acid in ethylene glycol was added to yield 15 ppm phosphorus in the theoretical yield of the polymer. The pressure in the autoclave was slowly reduced over a period of 45 minutes to less than 2 millimeters of mercury and the temperature was increased to between 275° C. to 300° C. to start the polymerization stage of the reaction, typically called polycondensation. Upon completing the vacuum letdown of the vessel, the power consumption of the agitator was monitored until an increase of 1.8 kilowatts was measured. The time necessary to obtain an increase of 1.8 kilowatts was taken as the polymerization time for the batch. At this point, the autoclave was pressurized with nitrogen to just above atmospheric and the batch extruded into a water trough and chipped. Chipped samples were collected at the start, middle, and end of the extrusion (nominally 0, 10 and 20 minutes) Typical polymer properties such as intrinsic viscosity (IV) expressed in deciliters/gram, number of carboxyl end groups (CEG) expressed in microequivalents/gram, the mole percent of diethylene glycol present (DEG), and color were measured on the chipped samples. The IV was determined by employing 8.0 grams of chip per hundred milliliters of ortho-chlorophenol at 25° C. The color test according to ASTM'S method E308-85 measured luminescence (L*), yellow-blueness (b*), and red-greenness (a*) of the polymer.

This experimental procedure was employed both for the control system and the present invention. The catalysts of the present invention were found to be effective regardless of when the catalysts were added, i.e., the catalysts could be added to the charge phase of the batch autoclave, at the initiation of direct esterification, or at the end of direct esterification, that is at the initiating stages of polycondensation. Additionally, some of the catalyst component system could be added with the charge phase of the batch autoclave raw materials while the remaining portion of the catalyst system could be added at the beginning of the polycondensation stage. A nomenclature system was developed to describe the method of addition of the metal salt catalyst to the autoclave. A slash was employed such that those metal salt catalysts added to the left of or in front of the slash were added to the charge phase of the autoclave, i.e. added with the terephthalic acid and the ethylene glycol at the initiation of the direct esterification, while those metal salt catalysts to the right hand side of the slash were charged into the system at the completion of the direct esterification stage, i.e. at the initiating stages of polycondensation. For example, a catalyst system comprising manganese, cobalt and antimony described in the nomenclature system as Mn+Co/Sb would indicate that manganese acetate and cobalt acetate were added to the charge phase of the autoclave, while the antimony oxide was added after the direct esterification, but prior to vacuum letdown.

The amount of catalyst employed was based upon the expected yield of the resultant polymer. The amount is stated in parts per million (ppm) of the metal ion in the various compounds used.

EXAMPLE 1

Six autoclave batches were prepared in accordance with the experimental procedure set forth above. The first batch is a control meaning that no catalyst system is employed in the direct esterification stage and antimony is employed in the polycondensation stage. The amount of antimony oxide employed was sufficient to provide 300 ppm antimony metal in the theoretical yield of the polymer. In Batches 2 to 6, the amount of catalyst added is set forth in Table 1. The manganese catalyst used in Example 1 was in the form of manganese acetate, while the cobalt catalyst used was in the form of cobalt acetate. Batch 4 does not contain antimony In Batch 6, no catalysts were employed in the direct esterification stage. The resultant PET polymerization times are set forth in Table 1 and the resultant polymer properties are set forth in Table 2.

TABLE I

THE RATE OF PET POLYMERIZATION

| BATCH | CATALYST SYSTEM | CONCENTRATION (PPM) | POLY TIME (MIN) |
|---|---|---|---|
| 1) (Control) | /Sb | 300 | 117 |
| 2) | Mn/Sb | 67:300 | 85 |
| 3) | Co/Sb | 18:300 | 120 |
| 4) | Mn + Co/ | 67:18 | 135 |
| 5) | Mn + Co/Sb | 67:18:300 | 60 |
| 6) | /Mn + Co + Sb | 67:18:300 | 60 |

TABLE 2

| BATCH | CATALYST | POLYMER PROPERTIES POLY TIME (min) | IV | CEG | DEG | L* | b* | a* |
|---|---|---|---|---|---|---|---|---|
| 4) | Mn + Co/ | 135 | 0.61 | 39.6 | 5.35 | 85.4 | 2.87 | −0.14 |
| 3) | Co/Sb | 120 | 0.62 | 18.6 | 6.25 | 79.4 | 2.85 | −0.40 |
| 1) | /Sb | 117 | 0.60 | 17.2 | 7.06 | 79.6 | 4.46 | −1.97 |
| 2) | Mn/Sb | 85 | 0.62 | 24.8 | 5.16 | 81.3 | 2.60 | −1.46 |
| 5) | Mn + Co/Sb | 60 | 0.61 | 31.8 | 5.59 | 80.7 | 5.85 | 0.02 |
| 6) | /Mn + Co + Sb | 60 | 0.63 | 24.9 | 8.40 | 83.2 | 6.65 | −0.72 |

The polymerization times of Example 1 were determined by an increase of 1.8 kw in the operation of the autoclave. The standard or control batch achieved the 1.8 kw level increase in 117 minutes. Batches 2 and 3 show that the addition of manganese alone in the direct esterification stage has some improvement over the control, while using cobalt alone does not show any improvement. Batch 4 clearly demonstrates that manganese and cobalt employed in the direct esterification stage, with no antimony employed in the polycondensation stage, actually increases the polymerization time to 135 minutes as compared to the control.

The results of Batch 5 and Batch 6 indicate that the catalyst system of the present invention does not appear to affect the direct esterification in producing PET from terephthalic acid and ethylene glycol. Batches 5 and 6 clearly indicate, however, that the catalyst system of manganese, cobalt and antimony does drastically increase the polymerization rate, as illustrated by the decrease in polymerization time. Batches 5 and 6 demonstrate that one particular advantage of the present system is that it does not matter whether the catalysts are added with the terephthalic acid/ethylene glycol (charged in with the raw materials) or added later at the end of direct esterification, i.e., at the beginning of polycondensation. Although cobalt used with antimony does not appear to impart any improvement in the polymerization rate, using manganese, cobalt, and antimony achieves the best result. Presumably cobalt makes manganese more active.

As can be seen from Table 2, the polymers showing the most rapid polymerization times tend toward higher CEG's, higher b*'s, higher L*'s, and lower DEG's than the control polymer.

EXAMPLE 2

In reviewing the results of Example 1, it could be concluded that the increased number of moles of catalytic metals in the polymer resulted in the reduced polymerization times, instead of attributing the decrease in polymerization time to an increase in catalytic rate. Example 2 addresses this question. A PET batch was prepared in accordance with the experimental procedure described previously, wherein the concentration of antimony was increased to correspond to the number of moles of manganese, antimony and cobalt present in Example 1, Batch 5. This calculated to a total of 540 ppm antimony. Additionally, Example 2 employed different target IV's to confirm that polymerization rate is increased irrespective of the target IV.

In Example 2, Batch 1 consisted of the control with a target IV of 0.82. Batch 2 was prepared having the catalytic system of Batch 5 of Example 1. The target IV was again set to 0.82. A third batch was prepared using 540 ppm of antimony in the polycondensation stage and setting the target IV to 0.62. Fourth and fifth batches were prepared so that the results could be compared with Batch 2 in Example 1. The results of Example 2 are set forth in Tables 3 and 4.

TABLE 3

THE RATE OF PET POLYMERIZATION

| BATCH | CATALYST SYSTEM | CONCENTRATION (ppm) | TARGET IV | POLY TIME (min) |
|---|---|---|---|---|
| 1) | /Sb | 300 | 0.82 | 235 |
| 2) | Mn + Co/Sb | 67:18:300 | 0.82 | 125 |
| 3) | /Sb [Hi] | 540 | 0.62 | 103 |
| 4) | Mn/Sb | 67:300 | 0.62 | 95 |
| 5) | Mn + Co/Sb | 67:18:300 | 0.62 | 75 |

TABLE 4

| BATCH | CATALYST | POLYMER PROPERTIES IV | CEG | DEG | L* | b* | a* |
|---|---|---|---|---|---|---|---|
| 1) | /Sb | 0.82 | 27.6 | 7.12 | 78.8 | 6.33 | −3.09 |
| 2) | Mn + Co/Sb | 0.82 | 35.7 | 5.56 | 76.8 | 5.45 | −0.82 |
| 3) | /Sb [Hi] | 0.63 | 16.4 | * | 73.6 | 2.81 | −0.17 |
| 4) | Mn/Sb | 0.62 | 22.7 | 5.33 | 79.9 | 4.31 | −2.03 |
| 5) | Mn + Co/Sb | 0.61 | 31.8 | 5.59 | 80.7 | 5.85 | 0.02 |

As Table 3 demonstrates, increasing the IV requires an increase in the polymerization time. Batch 1 had a polymerization time of 235 minutes and an IV of 0.82, whereas Batch 1 in Example 1 has a polymerization time of 117 minutes with an IV of 0.60. Comparing Batch 1 (poly time of 235 minutes) with Batch 2 (poly time of 125 minutes) demonstrates that the increase in catalytic activity is not dependent upon a narrow IV range.

When antimony was increased in Batch 3 to 540 ppm the polymerization time was reduced to 103 minutes from 117 minutes (see Batch 1 of Example 1).

When Batch 4 is compared with Batch 5, it is clear that cobalt increases the activity of manganese. The polymerization time of 85 minutes in Example 1 versus 95 minutes in Example 2 indicates that there may be an experimental error range of about 10 percent. Table 4 again demonstrates similar results as Table 2, i.e., that polymers showing the most rapid polymerization rates tend to have higher CEG's, higher b*'s, higher L*'s and lower DEG's than the control polymer. L* indicates luminescence and the higher the number, the better. Accordingly, the catalyst system of the present invention obtains PET polymers which are generally of higher luminescence than conventionally made PET polymers.

EXAMPLE 3

In Examples 1 and 2, the manganese, cobalt, antimony catalyst were used at a concentration of 67 ppm, 18 ppm and 300 ppm, respectively. In this example, the amount of catalyst was varied to determine the effect on the polymerization rate and PET properties.

For all eight batches, the target IV was 0.62. The first batch was the standard control batch taken from Batch 1 of Example 1.

The results of Example 3 are set forth in Table 5.

TABLE 5

| | | PET POLYMERIZATION RATE | | | | | |
|---|---|---|---|---|---|---|---|
| BATCH | CATALYST | CONCENTRATION (ppm) | POLY TIME (min) | IV | L* | b* | a* |
| 1) | /Sb | 300 | 117 | 0.60 | 79.27 | 4.58 | −2.17 |
| 2) | Mn + Co/Sb | 67:18:300 | 85 | 0.62 | 79.97 | 5.21 | 0.56 |
| 3) | /Mn + Co + Sb | 67:18:300 | 90 | 0.68 | 79.72 | 2.41 | −0.74 |
| 4) | 2 Mn + Co/Sb | 134:18:300 | 77 | 0.64 | 77.47 | 5.4 | −0.04 |
| 5) | Mn + 2 Co/Sb | 67:36:300 | 55 | 0.66 | 80.81 | 4.83 | 0.65 |
| 6) | 2 Mn + 2 Co/Sb | 134:36:300 | 67 | 0.64 | 78.53 | 3.61 | 0.75 |
| 7) | /2 Mn + 2 Co + Sb | 134:36:300 | 72 | 0.65 | 78.68 | 5.82 | 0.31 |
| 8) | Mn + Co/Sb | 20:10:1000 | 50 | 0.62 | 65.65 | 5.06 | −1.93 |

As is evident from Batches 2 and 3 and the Batches 6 and 7, the catalyst system does not have any effect in the direct esterification stage of the process. The addition of twice the amount of manganese (Batch 4) reduced the polymerization time. Thus, increasing the manganese to twice the amount initially employed does have some marginal effect on the catalytic rate.

As evidenced in Batch 5, when the cobalt quantity in the catalyst system is doubled while the manganese and antimony contents are held constant, the polymerization time is the lowest of any of the batches, while the IV is among the highest. This demonstrates that twice the amount of cobalt has a much more significant effect on the catalytic rate as compared to twice the amount of manganese.

Both Batches 6 and 7 employed twice the amount of manganese and twice the amount of cobalt as compared to initial batches. The polymerization times for each batch were close and within experimental error particularly considering that in Batch 7 the IV is slightly higher than that for Batch 6. There seems to be a distinction between Batch 6 and Batch 7 with respect to yellowness (b*) and redness (a*). While Batch 7 produces a polymer which is more yellow than Batch 6, the opposite is true with respect to redness Batch 6 produces a polymer which has more redness than the polymer produced by Batch 7. It is noted that both Batches 6 and 7 did not produce a polymer having polymerization times as short as Batch 5. The yellowness of Batch 5 is approximately the same as the control, and redness, while not as good as Batch 7 is still a vast improvement over the control.

With respect to Batch 8, the CEG was 19.5 while the DEG was 1.43. L* indicates the very dark color of the polymer due to the large amount of antimony. Although the polymer produced in Batch 8 is very dark, it would be useful in applications where color is not a factor.

EXAMPLE 4

In Example 4 other Lewis acids were tested as catalyst to determine their effectiveness with respect to polymerization times. Twelve batches were prepared. The metal catalysts zinc, magnesium, manganese, cobalt, and calcium were in the form of acetates while the antimony was employed in the form of antimony oxide. Previously 67 ppm manganese was employed. Batch 12 is the control. In Batch 1 only 64 ppm zinc was used, while in Batch 5 only 26 ppm magnesium was used and in Batch 9 only 23 ppm calcium was used. These amounts are the molar equivalent to 67 ppm manganese. The results of these catalyst compositions are set forth in Tables 6 and 7.

TABLE 6

| | | CATALYST COMPOSITION | | | | | | |
|---|---|---|---|---|---|---|---|---|
| | | METALS CONCENTRATION (ppm) | | | | | | Mean Poly Time |
| BATCH | CATALYST | Mn | Zn | Co | Mg | Ca | Sb | (min) |
| 1) | Zn + Co/Sb | — | 64 | 18 | — | — | 292 | 63 |
| 2) | 0.5 Zn + Co/Sb | — | 32 | 18 | — | — | 292 | 80 |
| 3) | 0.5 Zn/Sb | — | 32 | — | — | — | 292 | 88 |
| 4) | 0.5 Mn + 0.5 Zn/Sb | 32 | 32 | — | — | — | 292 | 60 |
| 5) | Mg + Co/Sb | — | — | 18 | 26 | — | 292 | 75 |
| 6) | 0.5 Mg + Co/Sb | — | — | 18 | 13 | — | 292 | 98 |
| 7) | 0.5 Mn + Co/Sb | 32 | — | 18 | — | — | 292 | 87 |
| 8) | Ca + Co/Sb | — | — | 18 | — | 47 | 292 | 88 |
| 9) | 0.5 Ca + Co/Sb | — | — | 18 | — | 23 | 292 | 100 |
| 10) | Mn + Co/Sb | 67 | — | 18 | — | — | 292 | 65 |
| 11) | /Mn + Co + Sb | 67 | — | 18 | — | — | 292 | 69 |
| 12) | /Sb | — | — | — | — | — | 292 | 133.5 |

TABLE 7

| BATCH | CATALYST | Poly Time (min) | L* | a* | b* |
|---|---|---|---|---|---|
| 1) | Zn + Co/Sb | 63 | — | — | 8.99 |
| 2) | 0.5 Zn + Co/Sb | 80 | 85.69 | −0.92 | 6.24 |
| 3) | 0.5 Zn/Sb | 88 | 83.76 | −0.90 | 4.50 |
| 4) | 0.5 Mn + 0.5 Zn/Sb | 60 | 94.55 | −0.45 | 2.70 |
| 5) | Mg + Co/Sb | 75 | 78.62 | 0.54 | 5.35 |
| 6) | 0.5 Mg + Co/Sb | 98 | 84.60 | −0.40 | 5.79 |
| 7) | 0.5 Mn + Co/Sb | 87 | 82.20 | −0.23 | 5.48 |
| 8) | Ca + Co/Sb | 88 | — | — | 4.05 |
| 9) | 0.5 Ca + Co/Sb | 100 | 81.56 | 0.14 | 4.55 |
| 10) | Mn + Co/Sb | 65 | 80.73 | 0.02 | 5.85 |
| 11) | /Mn + Co + Sb | 69 | 83.22 | −0.72 | 6.65 |
| 12) | /Sb | 133.5 | 79.59 | −1.97 | 4.46 |

The results of Example 4 indicate that zinc is a good substitute for manganese in the tri-catalyst system comprising zinc, cobalt and antimony because the polymerization times for Batch 1 and Batch 10 are approximately the same. In Batch 4, the manganese was reduced in half and zinc was substituted both for the cobalt and partially for the manganese, resulting in the best polymerization rate (i.e., lowest polymerization time) of Example 4. In Batch 5, magnesium was substituted for manganese and the resulting polymerization rate is acceptable. In Batch 8, calcium was substituted for the manganese in Batch 10 and the results were acceptable. Interestingly, the catalyst combination that demonstrated the highest rate increase (Batch 4) also demonstrated the best color values.

EXAMPLE 5

With the success demonstrated in Examples 1-4, it was decided to broaden the scope of the application beyond PET to include other polyesters. Since the only other polyester of any commercial significance is polybutylene terephthalate (PBT), the catalyst system of the present invention was tested with it.

The experimental procedure for the autoclave batches was as follows: All batches were run at 1.4 butanediol to terephthalic acid molar ratio. The autoclave was charged with 19 lbs. of the butanediol and 25 lbs. of terephthalic acid (TA). Unlike the manufacturing of PET, the manufacturing of PBT requires a catalyst in the direct esterification stage. Conventionally, tin is a good catalyst in both direct esterification and polycondensation stages. The particular tin employed was butyl stannoic acid (BSA). The direct esterification occurred at atmospheric pressure at a temperature of 220° C. for two hours. After the direct esterification stage, a 45 minute vacuum let down cycle was conducted. Polycondensation then occurred at 0.5 mm Hg absolute pressure at 255° C. for variable amounts of time, depending upon the batch. The batch was then extruded into a water trough and chipped. Chipped samples were collected at the start, middle and end of extrusion (nominally 0, 10 and 20 minutes). Six batches were run with the first two batches being the control in which 523 ppm of tin based on TA (1000 ppm BSA based on TA) was introduced at the beginning of the direct esterification stage. In the third batch, 523 ppm of tin based on TA was introduced in the direct esterification stage and 67 ppm of manganese and 18 ppm of cobalt were added in the polycondensation stage. The fourth batch employed 67 ppm of manganese and 18 ppm of cobalt in the direct esterification stage and 1,000 ppm of BSA in the polycondensation stage. In the fifth batch, 67 ppm of manganese and 18 ppm of cobalt were employed in the direct esterification stage, while 250 ppm of antimony was employed in the polycondensation stage with no other catalyst being employed. In the sixth batch, only 250 ppm of antimony was employed in the polycondensation stage. Antimony was in the form of antimony oxide, while manganese and cobalt were in the form of acetates. The results of these batches are set forth in Table 8. As is evidenced by Batches 4, 5 and 6, without any tin in the direct esterification stage, no polymer is made. Note that Batch 4 employs tin in the polycondensation stage, but because the direct esterification never occurred, the polycondensation stage was incapable of occurring.

As is evident from the record, the presence of manganese and cobalt may slightly increase the polymerization rate with the tin catalyst. (See Batch 3 as compared to Batches 1 and 2). It also appears that the use of manganese and cobalt may slightly increase the CEG level and increase polymer yellowness (b*), all of which are observed in a PET system. Comparing the results of PBT with the results of PET, it is clear that the use of magnesium and cobalt salts does not dramatically increase the polymerization rate as noted with antimony catalyzed PET. According to this example, it appears that the catalyst system of the present invention, which includes antimony, has no or perhaps only a slight effect on the polymerization rate of other polyesters like PBT.

TABLE 8

| Batch No | KW | IV | CEG | L* | b* | DE Rate[a] | Poly Rate[b] |
|---|---|---|---|---|---|---|---|
| 1 | 3.90 | 0.88 | 30 | 88.2 | −1.8 | 3.45 | 0.29 |
| 2 | 3.55 | 0.89 | 32 | 91.0 | −2.0 | 3.45 | 0.30 |
| 3 | 3.85 | 0.91 | 37 | 89.7 | −1.1 | 2.80 | 0.39 |
| 4 | 0.50 | 0.39 | 204 | 92.2 | 0.3 | 3.85 | 0.47 |
| 5 | 0.70 | 0.22 | 5772 | 93.4 | −0.1 | 2.00 | 0.16 |
| 6 | 0.70 | 0.22 | 5925 | 93.7 | −0.3 | 4.05 | 0.18 |

[a] DE rate = lbs H$_2$O/DE time in hours
[b] poly rate = final IV/poly time in hours

EXAMPLE 6

Examples 1-5 demonstrate the invention by means of batch processes. In Example 6, a continuous polymerization process was employed. The catalyst was introduced with the raw materials at the beginning of the continuous polymerization process. A thermal stabilizer consisting of 20 ppm of polyphosphoric acid was added based on weight of the theoretical yield of the polymer. Five cells were prepared for the continuous polymerization process. The operating conditions for all five cells were essentially identical. Four vessels were used in the continuous polymerization line. The first and second vessels were at a temperature range of from 240° C. to 260° C. with a pressure from 0 to 35 psig. The third and fourth vessels can be operated at a temperature range of from 260° C. to 290° C., with a pressure from 0 to 30 mm Hg. Specifically, Cells 1, 3 and 5 had a fourth vessel temperature which was 5° C. lower than Cells 2 and 4. The through-put of all vessels was constant and the resulting polymer yield was from 35 to 60 pounds per hour. The results, including the amount of catalysts are set forth in Table 9.

TABLE 9

|  | 1 | 2 | 3 | 4 | 5 |
|---|---|---|---|---|---|
| Manganese (ppm) | 0 | 67 | 67 | 34 | 34 |
| Cobalt (ppm) | 0 | 18 | 18 | 18 | 18 |

TABLE 9-continued

|  | 1 | 2 | 3 | 4 | 5 |
|---|---|---|---|---|---|
| Sb (ppm) | 300 | 300 | 300 | 300 | 300 |
| Final Vessel Pressure (mm Hg) | 3.51 | 5.88 | 4.48 | 4.72 | 3.35 |
| IV | 0.66 | 0.66 | 0.65 | 0.68 | 0.66 |
| b* | 7.89 | 13.66 | 10.58 | 9.84 | 7.57 |
| L* | 87.56 | 84.37 | 84.00 | 85.94 | 86.05 |
| a* | −3.48 | −4.31 | −3.66 | −3.78 | −3.40 |
| CEG | 21.90 | 31.40 | 29.26 | 26.96 | 21.60 |
| DEG | 2.04 | 2.39 | 2.40 | 2.16 | 2.12 |

Cells 2 and 4 show higher final vessel vacuum pressures over that of the control (Cell 1), and Cells 3 and 5 indicating an increased polymerization rate as expected due to higher final vessel temperature. Conversely, this result also indicates that for the same polymerization rate, a lower temperature (energy savings) can be used to obtain the same through-put as the control Cell.

EXAMPLE 7

Example 7 is a comparative example comparing various catalyst systems set forth in U.S. Pat. No. 3,962,189 to Russin et al with the present invention. A series of five batches of PET were prepared from the TA process using DMT catalyst systems set forth in the above-identified reference.

In Batch 1, 67 ppm manganese and 18 ppm cobalt were employed in the direct esterification stage. At the end of the direct esterification stage, 170 ppm of phosphorus in the form of triethylphosphate was employed to arrest the catalytic activity. At the beginning of the polycondensation stage, 300 ppm of antimony was employed. This example shows the effect of using a typical amount of a sequestering agent (phosphorus) on the catalyst systems of the present invention.

Batch 2 employed 119 ppm manganese and 10 ppm cobalt in the direct esterification stage. At the end of the direct esterification, 170 ppm of phosphorus in the form of triethylphosphate was added to sequester the catalytic activity of the manganese and cobalt. At the beginning of the polycondensation stage, 292 ppm of antimony was added. This example is directly comparable to Example 15 of the above-identified U.S. patent.

Batch 3 employed 67 ppm manganese and 18 ppm cobalt in the direct esterification stage. At the end of the direct esterification stage, 20 ppm phosphorus was added as a thermal stabilizer. At the initiation of the polycondensation stage, 300 ppm of antimony was added. This example is the "control" and standard of the present invention.

In Batch 4, 32 ppm of zinc was added at the beginning of the direct esterification stage. At the end of the direct esterification stage, 170 ppm of phosphorus was added in the form of triethylphosphate as a sequestering agent. At the beginning of the polycondensation stage, 300 ppm of antimony was added. This example is given to show the effect of the phosphorus on the catalyst system of the present invention. Batches 1, 2 and 4 all enjoy the high level of phosphorus being employed as a short-stop to arrest the catalytic activity of any catalyst employed in the direct esterification stage.

In Batch 5, 67 ppm manganese and 18 ppm cobalt were added at the beginning of the direct esterification stage. At the end of the direct esterification, 20 ppm of phosphorus was added as a thermal stabilizer as as was done in Examples 1-5 above. At the beginning of the polycondensation stage, 257 ppm of titanium (as tetrabutyl titanate) was employed as a substitute for the antimony as is done with certain examples in the above-noted U.S. patent. The results of these batches are set forth in Table 10. As is evident from the results, Batches 1 and 2 did not achieve a substantial increase in the polymerization rate as compared to the present invention. In fact, both of these examples illustrate a drastic decrease in the polymerization rate. Furthermore, Batch 2 indicates that the IV level is significantly lower than the remaining batches.

TABLE 10

| Batch | Time (min) | IV | CEG | DEG | L* | b* | a* |
|---|---|---|---|---|---|---|---|
| 1 | 200 | 0.63 | 79.4 | 4.53 | 84.24 | 7.95 | −0.43 |
| 2 | 200 | 0.54 | 100.6 | 4.18 | 86.73 | 4.38 | −0.72 |
| 3 | 65 | 0.66 | 36.6 | 5.42 | 78.64 | 4.99 | 0.95 |
| 4 | 130 | 0.66 | 28.7 | 8.58 | 84.48 | 3.73 | −1.70 |
| 5 | 40 | 0.65 | 29.7 | 6.52 | 81.84 | 23.93 | −3.59 |

Batch 4, like Batches 1 and 2 shows a substantial increase in the polymerization time. Batch 5, as compared with control Batch 3, achieved even a shorter polymerization time. However, both yellowness (b*) and redness (a*) were substantially worse (and unacceptable) than that of control Batch 3. Each of Batches 1, 2, 4 and 5 would not be an improvement in the process of the present invention because either the polymerization rate is too slow, or the color is unacceptable.

EXAMPLE 8

A series of 12 cells were prepared using the continuous polymerization process under the conditions described with respect to Example 6 to further investigate the amounts of manganese, cobalt and antimony. The results are set forth in Table 11 below.

TABLE 11

| Cell | Mn:Co ppm | Sb ppm | IV | Vac. (mm) | CEG | DEG | L* | a* | b* | Sb Actual | Mn Actual | Co Actual |
|---|---|---|---|---|---|---|---|---|---|---|---|---|
| 1 | 40:0 | 250 | .637 | 2.917 | 19.7 | 3.14 | 87.51 | −2.64 | 8.03 | 225 | 34 | <3 |
| 2 | 40:20 | 250 | .651 | 2.831 | 21.9 | 2.96 | 85.23 | −2.78 | 9.81 | 210 | 19 | 16 |
| 3 | 60:30 | 250 | .654 | 3.101 | 27.4 | 3.66 | 83.46 | −2.64 | 10.62 | 209 | 20 | 29 |
| 4 | 20:10 | 250 | .653 | 5.506 | 19.2 | 3.14 | 88.23 | −2.10 | 6.66 | 223 | 32 | 11 |
| 5 | 80:20 | 250 | .643 | 3.142 | 31.7 | 3.77 | 85.79 | −2.42 | 8.52 | 216 | 40 | 22 |
| 6 | 0:20 | 250 | .633 | 1.750 | 20.0 | 2.98 | 87.99 | −2.12 | 5.81 | 218 | 3 | 21 |
| 7 | 60:10 | 250 | .677 | 2.700 | 21.1 | 3.19 | 87.10 | −3.35 | 10.16 | 247 | 26 | 11 |
| 8 | 40:40 | 250 | .663 | 2.100 | 25.3 | 3.51 | 84.43 | −1.73 | 6.26 | 208 | 36 | 35 |
| 9 | 40:20 | 250 | .645 | 2.439 | 21.3 | 2.93 | 86.13 | −1.89 | 5.94 | 215 | 28 | 26 |
| 10 | 40:10 | 250 | .671 | 2.480 | 19.9 | 2.76 | 87.09 | −2.69 | 8.22 | 224 | 36 | 11 |
| 11 | 20:30 | 250 | .639 | 1.580 | 18.6 | 2.61 | 86.16 | −1.49 | 4.22 | 218 | 18 | 30 |
| 12 | 0:0 | 250 | .656 | 1.800 | 17.4 | 2.53 | 88.76 | −2.92 | 8.17 | 218 | 0 | <3 |

As is evident from Table 11, Cell 4 having 20 ppm manganese and 10 ppm cobalt with 250 ppm antimony (based on the theoretical yield of polymer) had the softest vacuum at 5.506 mm of mercury. These results indicate that a small amount of manganese and cobalt is capable of producing the best result. The control was Cell 12. Cells 2 and 9 are duplicates of one another.

Thus, it is apparent that there has been provided, in accordance with the invention, a catalyst system, a method of preparing PET based on that catalyst system, and a novel polyethylene terephthalate composition that fully satisfies the objects, aims and advantages as set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the sphere and scope of the invention.

What is claimed is:

1. In a process for making polyethylene terephthalate from terephthalic acid comprising the steps of:
    (1) reacting terephthalic acid and ethylene glycol in a direct esterification reaction to produce monomer and water;
    (2) removing water during said direct esterification reaction; and
    (3) polymerizing the product of steps 1 and 2 by polycondensation;
wherein the improvement comprises adding prior to polymerizing an effective catalytic amount of:
    (a) a first metal catalyst of at least one of zinc or cobalt in a range of from about 5 to about 60 ppm;
    (b) a second metal catalyst of at least one of zinc, manganese, magnesium, or calcium in a range of from 10 to 150 ppm; and
    (c) antimony, such that the total antimony present is in a range from about 650 to about 1100 ppm;
wherein all amounts are based on the theoretical yield of said polyethylene terephthalate.

2. In the process of claim 1, wherein said cobalt or zinc is present in a range of from about 10 to about 40 ppm.

3. In the process of claim 2, wherein said second metal catalyst is in a range of from about 20 to about 50 ppm.

4. In the process of claim 1, wherein said first metal catalyst is from about 10 to about 40 ppm cobalt, and said second metal catalyst is from about 20 to about 50 ppm manganese.

5. In the process of claim 1, wherein said first metal catalyst is from about 10 to about 40 ppm cobalt, and the second metal catalyst is from about 20 to 50 ppm zinc.

6. In the process of claim 1, wherein each of said first and second metal catalysts and said antimony are metallic compounds.

7. In the process of claim 6, wherein said metallic compounds are carboxylated metallic salts.

8. In the process of claim 6, wherein said metallic compounds are metal oxides.

9. In the process of claim 6, wherein said metallic compounds are metal halides.

10. In the process of claim 6, wherein said metallic compounds are metal compounds of Group VI.

11. In the process of claim 6, wherein said metallic compounds are metal amines.

12. In the process of claim 6, wherein said metallic compounds are at least one of carboxylated metallic salts, metal halides, metal compounds of Group VI, or metal amines.

13. Polyethylene terephthalate made from terephthalic acid having:
    a) a first metal catalyst of at least one of cobalt or zinc present in a range of from about 5 ppm to about 60 ppm;
    b) a second metal catalyst of at least one of zinc, manganese, magnesium or calcium present in a range of from about 10 ppm to about 150 ppm; and
    c) antimony present in a range of from 650 ppm to 1100 ppm;
wherein all amounts are based on the theoretical yield of said polyethylene terephthalate.

14. Polyethylene terephthalate of claim 13, wherein each of said first and second metal catalysts and said antimony are metallic compounds.

15. Polyethylene terephthalate of claim 14, wherein said metallic compounds are carboxylated metallic salts.

16. Polyethylene terephthalate of claim 14, wherein said metallic compounds are metal oxides.

17. Polyethylene terephthalate of claim 14, wherein said metallic compounds are metal halides.

18. Polyethylene terephthalate of claim 14, wherein said metallic compounds are metal compounds of Group VI.

19. Polyethylene terephthalate of claim 14, wherein said metallic compounds are metal amines.

20. Polyethylene terephthalate of claim 14, wherein said metallic compounds are at least one of carboxylated metallic salts, metal halides, metal compounds of Group VI, or metal amines.

* * * * *